INVENTOR.
LOUIS KOPITO

Sept. 14, 1965 L. KOPITO 3,206,386
APPARATUS FOR ELECTROCHEMICAL ANALYSIS
Filed April 24, 1961 2 Sheets-Sheet 2

INVENTOR.
LOUIS KOPITO
BY Morse & Altman

United States Patent Office 3,206,386
Patented Sept. 14, 1965

3,206,386
APPARATUS FOR ELECTROCHEMICAL ANALYSIS
Louis Kopito, Brookline, Mass., assignor to Baird-Atomic, Inc., Cambridge, Mass., a corporation of Massachusetts
Filed Apr. 24, 1961, Ser. No. 104,854
2 Claims. (Cl. 204—195)

This invention relates to the art of electrochemical analysis. More particularly the invention relates to apparatus, systems and methods for quantitative electrochemical analysis.

Electrochemical analysis broadly makes use of the flow of electricity in a solution. The methods of electrochemical analysis are generally useful for:

(a) preparation of a chemical for further analysis
(b) qualitative analysis of an unknown chemical and
(c) quantitative analysis of a known chemical present in solution.

In the prior art two electrodes are typically immersed in a solution containing the substances to be analyzed. An electrical current generated externally to the solution is passed therethrough and the analysis carried out by virtue of the effects produced in the solution by this current. While the methods of the present invention are applicable to electrolytic processes for (a) and (b) above, they are particularly useful for quantitative measurements of solute electrolyte in solution.

Prior art methods, apparatus and systems for quantitative analysis typically involve relatively large samples. In the prior art relatively inert metals such as platinum are used for electrodes to avoid electrode contamination. Such electrodes, however, indeed become contaminated and further processing of the electrode is required. With the prior art methods of immersing the electrodes in solution, such methods are restricted from use for small samples, for example, twenty to forty millionths of a liter, or less. The requirement for measuring such small samples is widespread. Electrochemical analysis is typically used with increasing frequency for biological specimens such as sweat, tears, urine, etc. In many cases these specimens can only be obtained in relatively minute quantities, for example, forty millionths of a liter or less.

In contrast with such prior art methods, the present invention provides disposable, contaminate proof electrodes and enables the measurement of relatively minute quantities of test electrolyte solution.

Further in accordance with the present invention a control system is contemplated for the monitoring of continuous, batch processes. Prior art systems for the control of batch processes require complex apparatus and are subject to contamination. An undesirable number of steps are required for performing the operation. Furthermore a large amount of relatively complicated glassware is associated with such systems. In contrast, the system of instant invention requires the use of only a minimum of glassware.

It is, therefore, an object of the invention to provide an improved apparatus for electrochemical analysis.

A further object of the invention is to provide an improved apparatus for electrochemical analysis substantially eliminating the effects of electrode contamination.

Another object of the invention is to provide improved apparatus, methods and systems for electrochemical analysis useful for relatively minute quantities of test solution.

Yet another object of the invention is to provide an improved apparatus for electrochemical analysis reliable in operation and simple in structure.

In accordance with one aspect of the invention there is provided an apparatus for electrochemical analysis. The apparatus includes a source of electrical power and a first electrode coupled to the power source. The electrode has a predetermined exposed contact area. A disposable electrode of greater exposed contact area than the first electrode covers the predetermined area in electrical contact therewith. An absorbent carrier for a predetermined quantity of test electrolyte solution is provided. The carrier has an exposed test area greater than the predetermined area. A second electrode is coupled to the power source and has an exposed contact area greater than the predetermined area. The electrodes and the carrier are juxtaposed in contact. The carrier and disposable electrode are disposed between the first and second electrodes. Electrical indicator means are coupled to the solution and provide indications of the quantity of solute in the solution.

Further in accordance with the invention there is provided an electrochemical control apparatus. The apparatus includes a source of solute and a source of solvent. Solution means are coupled to the sources for providing a source of solution. Measurement means are coupled to the solution means for providing a solute electric signal indicative of the relative quantity of solute in solution. Reference means provide a reference electrical signal indicative of a desired quantity of solute. Comparator means are coupled to the measurement and reference means for providing an error signal proportional to the difference between the solute and reference signals. Signal control means are coupled to the solute source and the comparator for controlling the flow of solute to the solution means in accordance with the error signal.

In accordance with the invention a method of electrochemical analysis is provided. A predetermined quantity of test electrolyte solution is applied to an absorbent carrier to provide an exposed electrical contact area. The carrier is placed in contact with a disposable electrode. The carrier and electrode are placed in electrical contact between a pair of electrodes under a predetermined constant pressure. The pair of electrodes is connected to a source of electrical power. An electrical current is passed through the test solution. The concentration of total solute in solution is determined by measuring an electrical characteristic associated with the solution under test. In one aspect of the method, the concentration of total solute in solution is determined by measuring the variation in current flow with respect to time and in accordance with the decomposition of the electrolyte in the solution. In another form of the invention the concentration of a predetermined solute in solution is determined in accordance with the conductance of the test solution.

For a better understanding of the present invention, together with other and further objects thereof, reference is made to the following description taken in connection with the accompanying drawings and its scope will be pointed out in the appended claims.

Principles of operation

Figure 1:
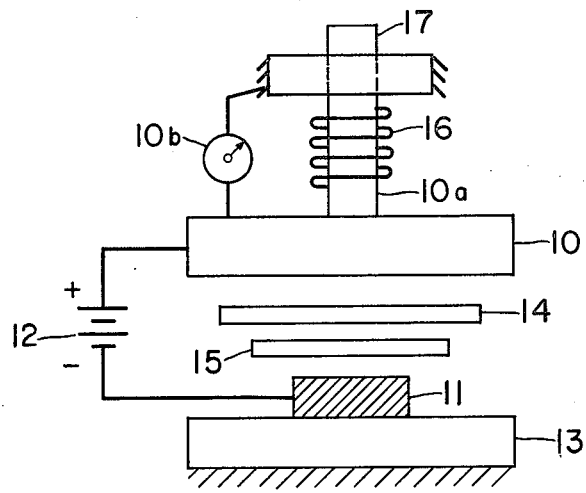
FIG. 1 is a schematic drawing of an apapratus for electrochemical analysis embodying the invention.

It is well known that the amount of chemical decomposition in electrolysis is proportional to the quantity of electricity passing through an electrolytic solution. The quantity of different substances liberated at the electrodes is proportional to their chemical weights. The process of electrolysis can be completed by keeping the time of reaction constant and varying the current or voltage, maintaining the current or voltage constant and varying the time, or by varying both time and current or voltage and integrating the result. In totally electrolytic phenomena, where there is little or no conduction of an electronic nature, and at a constant temperature, the quantity of electricity required to liberate one equivalent of any substance is one Faraday or 96,500 coulombs. If E is the equivalent weight of a material liberated at the electrode, 96,500 amperes flowing for one second tend to liberate E grams of the substance.

Expressed mathematically:

Equation (1)  $$W = \frac{ItE}{96,500}$$

where W is the weight in grams, I is the current in amperes and $t$ is the time in seconds.

By writing the Equation (1) in a different form, we obtain:

Equation (2)  $$It = \frac{96,500 \times Adn}{W}$$

where A is the area of contact of the electrode in square centimeters, $d$ is the weight of material tested, W is the atomic weight of the solute element forming in equivalents per atom, I is the current in amperes and $t$ is the time in seconds.

It will be apparent from the above that the time $t$ can be defined in the following expression:

Equation (3)  $$t = \frac{96,500 \times Adn}{IW}$$

For determining concentrations of predetermined composition the factor $n$ can be expressed:

Equation (4)  $$n = ktI$$

For a constant voltage, the time required to decompose any totally electrolytic solution is directly proportional to the square root of concentration of the reduced or oxidized substance. It is this concept that provides a basis for the present invention. It will be apparent from the above that the decomposition of an electrolytic solution provides a basis for the measurement of the degree of concentration of the solute, the amount of solute may be quantitatively determined by measuring the current flow at controlled potentials or voltages. The current may be measured while the electrolysis of the samples is carried to completion.

In one form of the invention the degree of concentration is determined by measuring the rate of decomposition of an electrolyte in solution. A small circular disc of filter paper, for example, is impregnated with a reproducibly small amount, e.g., one drop or approximately forty millionths of a liter, of the solution to be tested. The paper carrier is placed between a carbon electrode of predetermined area and a disposable electrode formed, e.g., of aluminum. A reproducible, predetermined degree of constant pressure is applied through the electrodes through the paper carrier throughout the measurements. A relatively small, preselected constant direct voltage, e.g., in the range of —3.0 to +3.0 volts, is applied across the electrodes to cause a current to pass through the solution.

For analysis of specific solutes, the magnitude of the voltage is selected in accordance with known disassociation voltages applicable to the material to be tested.

The current passing through the solution is measured continuously and a graph of the decreasing current versus time is obtained. The time required for complete decomposition of the electrolyte or the time required for the electrolyte to reach a convenient arbitrary "end point" as determined on the curve of asymptotically decreasing current, or asymptotically increasing resistance, is measured. The time measurement in seconds is directly proportional to the square root of concentration of the liberated ions in the solution. Note Equation (4) above. The concentration in equivalents may be read directly from a graph or chart previously prepared from measurements of known concentrations of the material tested.

Description and operation of the apparatus for electrochemical analysis in FIGS. 1–4

Referring now in more detail to the drawings and with particular reference to FIG. 1, there is here illustrated an apparatus for electrochemical analysis. The apparatus generally comprises a pair of relatively permanent electrodes, i.e., a platinum and a carbon electrode. A disc-shaped paper-like carrier such as chromatographic filter paper and a disc-shaped disposable electrode are disposed between the two relatively permanent electrodes. The electrodes are connected to a source of electrical power; here a direct current supply is used. A measuring device is coupled to the electrodes to provide an indication of the gap between the electrodes.

Thus, a movable, relatively permanent anode 10 formed, for example, of platinum and a cathode 11, formed, e.g., of carbon, are shown connected to a direct current source 12 of electrical power. The cathode 11 is mounted on a supporting base 13. An absorbent, disc-shaped carrier 15 formed for example from purified chromatographic filter paper, and a disposable electrode 14, formed for example from aluminum, are disposed between the anode 10 and cathode 11. The anode is connected to a shaft 10a which is surrounded by a resilience means, a spring 16 tending to compress the anode 10 and cathode 11 together. The spring 16 is contained between the anode 10 and a channeled supporting element 17 which is coupled to the base 13. The base 13 and element 17 are indicated at mechanical ground. A micrometer surface gauge 10b is coupled to the electrodes to provide an indication of the gap therebetween. The gauge 10b is here coupled to the member 17 and measures the position of the electrode 10 relative to mechanical ground. The pressure is adjusted to provide a reproducible, small gap between the electrodes.

In operation a micropipet is used to release a drop of test solution on the carrier 15. The solution spreads through and is absorbed by the carrier. The movable anode 10 is raised in opposition to the force of the spring 16. The sample and disposable disc electrode are placed between the anode 10 and cathode 11 with the sample adjacent to the cathode. For other solutes, the sample may be placed adjacent the anode. The anode is released to apply a predetermined pressure on the sample while under test.

To insure reproducible results a predetermined constant pressure is applied to the sample, e.g., 40 p.s.i. The constant pressure is obtained by using a suitable spring constant and appropriate dimensions for the spring 16. The carrier 15 may be formed from purified chromatographic filter paper .005 inch thick and 7/8" in diameter. The disposable electrode 14 may be formed from aluminum a few thousandths of an inch thick and one inch in diameter. The permanent anode 14 if formed from platinum is susceptible to attack by halide depositions. Here the disposable electrode 14 shields the anode and precludes its chemical contamination.

Figure 2:
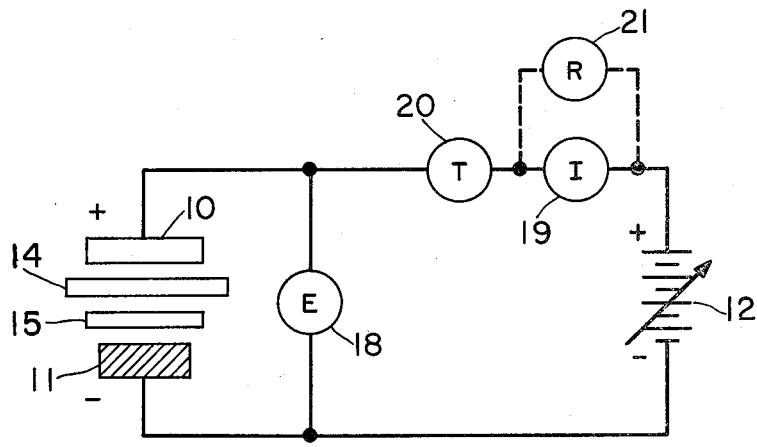
FIG. 2 is a schematic circuit diagram illustrating the electrical circuitry and test connections associated with the apparatus in FIG. 1.

In the schematic diagram on FIG. 2, the electrodes 10 and 11 are shown connected to a voltmeter 18, an ammeter 19, a timing device 20 and resistance-measuring device or ohmmeter 21. The direct current source 12 is shown variable to provide precise voltages required for test. By maintaining a constant voltage, the variation in current may be measured at discrete time intervals. Timing marks may be used for continuous graphic presentations. As noted above the voltmeter may be used by supplying a constant current and measuring the variation in voltage or resistance of the solution in the carrier 15. On the other hand, the voltage may be maintained constant and the current allowed to vary. The variation of current through the solution 15 may be interpreted as an inversely proportional variation in resistance as indicated by the ohmmeter 21.

It will be apparent in each of the above cases that the conductance of the solution during electrolysis is of primary interest. The measurement of conductance is apparent from the flow of current or from its inverse quantity resistance which, in turn, is essentially a measure of the current through the solution or of the voltage across the solution. Thus we maintain the current constant and effectively measure the conductance of the solution by the variation in voltage across the electrodes 10 and 11 or the current through the solution in the carrier 15.

To determine the concentration of a known solution, e.g., a saline solution, a current is passed through the solution until electrolysis is complete or reaches an arbitrary end-point. By graphing the current, or resistance, versus time and noting the end-point in terms of decreasing current or increasing resistance, the concentration may be determined. For known solutes the degree of concentration is proportional to current and inversely proportional to resistance of the solution.

The circuit as indicated is also useful for so-called potentiometric analysis. The potential or voltage at which oxidation and reduction takes place is fairly uniquely defined for a large class of materials. The deposition of electroyte due to electrolytic decomposition on, for example, the disposable anode 14 can, of course, be carefully controlled by controlling the voltage of the source 12 rather precisely. Although the circuit as shown in FIG. 2 is a relatively simple, the accuracy of measurement may be improved by the use of various bridge circuits.

For the purpose of electrographic analysis minute amounts of substances have been used in the prior art for detection in the surface of a metallic sample. The test paper is impregnated with reagents suitable for detecting or determining the desired constituent as applied to the surface of the metallic sample. The sample provides one electrode. The second electrode is applied to the test paper. Trace constituents are thus electrolyzed and caused to travel through the test paper. In the paper they react with the test reagent to produce a coloration or other visible evidence of presence. This is obviously a qualitative procedure. Similarly, it is known in the prior art for a process known as electrophoresis or cataphoresis to use test solution impregnated paper samples. Here, the purpose of the technique is to produce separation and hence identification of unknown samples based on the characteristic of certain ionic substances, which tend to migrate at different rates towards the anode or cathode. Electrolysis in this application is used to separate and identify the various constituents by application thereafter of suitable reagents. These techniques are entirely distinguishable from the present invention wherein paper impregnated with an electrolyte test solution provides a part of an apparatus for the quantitative measurement of solute or electrolyte.

In accordance with the methods of the present invention electrolysis, while useful as a means of preparing a sample for detection or analysis by some other methods, is particularly useful in obtaining quantitative analytical information from an electrochemical property of the solution under test. As will be apparent, the distinction lies in obtaining the electrochemical information while the solution is under test as opposed to utlizing electrolysis to provide samples which may later be identified or by some other method. In this category is the concept of carrying out an electrolytic reaction with 100 percent current efficiency in determining the reacting substance from the amount of current used. Where the basic parameters are used for quantitative purposes, essentially the conductance of the solution under test provides an indication of the concentration of solute. The electrical current may be a high frequency current, i.e., 1000 to 10,000 cycles. This test has application in determination of the quantity of electroyte solutes and solutions of known concentration.

When an electric current is passed through a solution between two parallel electrodes of uniform area with a known distance between the electrodes, the resistance of the solution is directly proportioned to the distance and inversely proportional to the area. The specific resistance of the solution, a proportionality constant useful in providing the measurable resistance, is constant only for a specific solution and a definite temperature. Since the resistance is specific only for a particular solution and definite temperature, the resistance, or its inverse conductance, provides an electrical property associated with the solution useful in determining the quantity of solute present. Accurate measurement of conductance with direct current is effected by changes in ionic concentrations of electrolyte due to electrode reaction which cause changes in resistance. Such reactions are due to the chemical contamination of the electrode. For this reason, conductance measurements are commonly carried out with an alternating current as indicated above at a potential of 6 to 10 volts and as high as 500 volts. This avoids the interfering effects of electrode reactions. However, using a disposable anode in the manner of the present invention, conductance measurements may be made with excellent accuracy with direct current. This avoids the necessity for precious metal electrodes such as platinum. Even platinum is limited in application because of contaminating effects.

Figure 3:
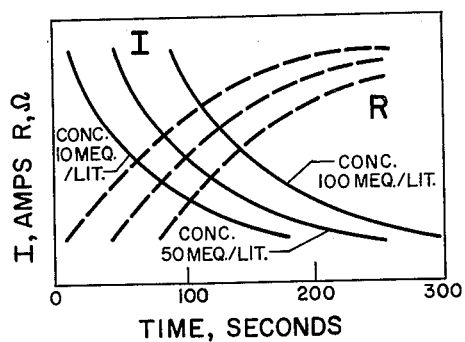
FIG. 3 is a graph illustrating an aspect of the operation of the invention.

In FIG. 3 is shown a graph of current passing through the solution against time. The dashed line curves represent the corresponding variation in resistance against time. It will be noted that the current asymptotically approaches zero with time and the particular curve is specific for a given material.

Figure 4:
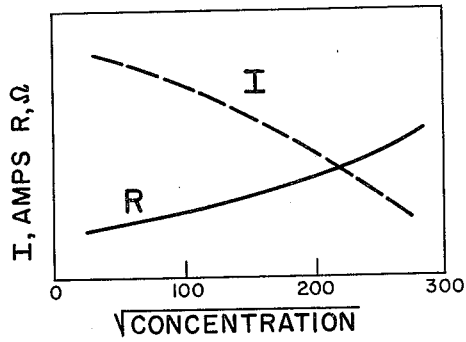
FIG. 4 is a graph illustrating another aspect of the operation of the invention.

In FIG. 4 for a known solute, the variation in concentration verses current is illustrated. By knowing the relationship of concentration verses current and obtaining the variation in current with respect to time, it is possible to determine the concentration of the solution by a number of current or resistance measurments. Conversely, with known concentrations of the same solution the current or resistance measurements are indicative of the character of the solute.

Figure 5:
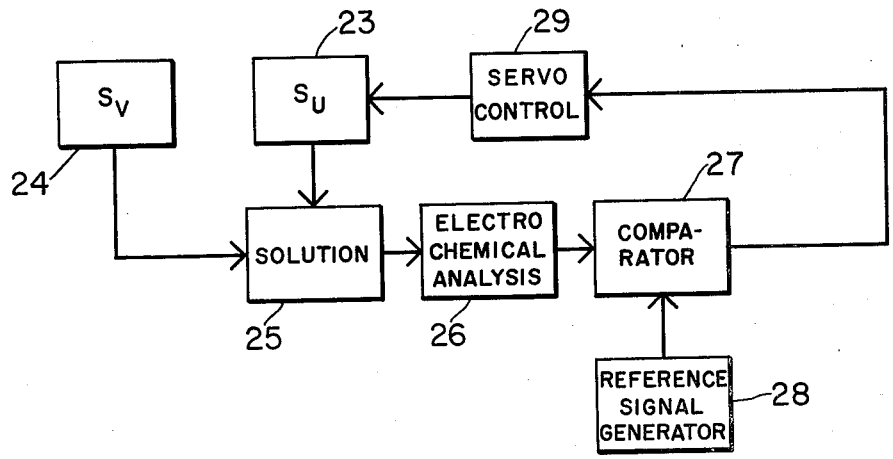
FIG. 5 is a schematic block diagram of an electrochemical control apparatus embodying the invention.
Figure 6:
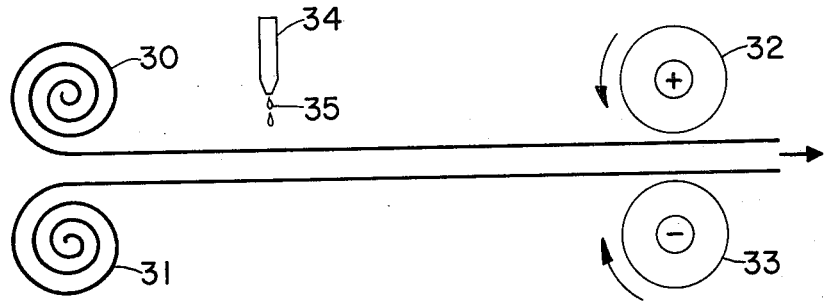
FIG. 6 is a detailed schematic drawing of a portion of the apparatus in FIG. 5.

*Description and operation of the electrochemical apparatus in Figs. 5 and 6*

Referring now in FIG. 5, it is here illustrated a solute source 23 and solvent source 24 for a solution source 25. The solution source is coupled to a solute measuring device 26 which is in turn coupled to a comparator 27. In the control system of FIG. 5 there is presented a servo system for the control of the application of a solute to a solution by means of the apparatus for electrochemical analysis of the present invention. The servo controls the flow of the solute into the solution in accordance with the error signal produced by comparing a signal representative of the relative quantity of solute in solution with a reference signal. Thus in the drawing, a source of solute 23 and a source of solvent 24 are coupled to a solution means 25 providing a source of solution. The solution means 25 are coupled to an electrochemical analytic device 26 which is in turn coupled to a comparator 27. A reference signal generator 28 is coupled to the comparator 27. The output of the comparator is coupled to a servo control 29. The output of the servo control in turn is coupled to the source 23 of solute. The flow of solute from the source 23 is coupled back to the servo control 29. The control 29 further responds to an input from the solution 25.

In FIG. 6 an apparatus for continuous electrochemical analysis of the solution is illustrated. As shown in the drawing a continuous roll of absorbent paper-like carrier 30 and a continuous roll of cathode foil 31 are driven between a pair of electrode rollers 32 and 33. A micropipette 34 is connected to a source of solution not shown. Test samples 35 from the pipette 34 drop on the carrier 30 at a rate synchronized with the rotations of the electrodes 32 and 33. The electrodes 32 and 33 are connected to a source of direct current power not shown.

In operation solute from the source 23 is applied to the solution source 25. At the same time solvent from the source 24 flows into the solution source of 25. Drops of the solution as shown in FIG. 6 are applied to an absorbent carrier and the electrochemical analysis performed by methods indicated above. Here the rotation of the electrodes 32 and 33 is chosen to be, for example, of the order 6 r.p.m. to enable an electrolysis of the test sample of the order of seconds while it is compressed between the electrodes. The cathode 33 as shown provides an anode which is covered by the disposable cathode foil 31. The roller 33 could be a rubber roller and a connection made directly to the aluminum foil. In any event, pressure is applied compressing the rollers to provide a predetermined degree of pressure on the sample and a predetermined area of test. In a practical situation a roller 6 inches in diameter may be used and one inch wide to provide a test area of less than one square inch. A typical pressure useful for this application is of the order of five pounds per square inch. Pressure range may be as high as 40 pounds per square inch.

The output signal of the solute measurement device 26 is applied to a comparator 27. A reference signal generator 28 produces a reference signal which is applied to the comparator to produce a difference signal between the two. This difference signal or error signal is applied to the servo control 29 which controls the flow of solute from the source 23 into the solution means 25. Where the solute and reference signals are direct current signals, the comparator may comprise a clamping circuit at the upper and lower ranges which provides the reference direct current voltage for comparison with the direct current voltage output of the measurement device. When the voltage is too hgh indicating too high a concentration of the solute, it exceeds the voltage reference supplied by the clamping circuit to provide, i.e., a positive D.C. signal applied to the servo control which reduces the flow of solute 23. There is, of course, in this system contemplated a more or less constant flow of solvent from the source 24 as applied to the solution means 25. When the voltage output of the measurement means 26 goes below, for example, a negative lower bound clamping voltage, a negative signal output is applied to the servo control to increase the flow of solute in the solution. In this manner, continuous monitoring and control of a batch process is obtained.

The present invention greatly enhances the art of chemical analysis and control. The invention has broad application for industrial and biological requirements. It may usefully be employed for example to determine the concentration of halides in biological specimens, such as sweat, tears, urine, blood etc. and in other such electrolytes of known composition. It may be used to determine the total electrolyte in unknown solutions such as water, distilled water, sea water, sewage effluents, etc. Continuous or spot monitoring control of processing in industry where electrolyte activity is of interest in the process provides an important area of use. Such processes include the manufacture of paper, beverages, oil, soaps, etc.

While there have been described what are at present considered to be the preferred embodiments of the invention, it will be obvious to those skilled in the art that various changes and modifications may be made therein without departing from the invention, and it is, therefore, aimed in the appended claims to cover all such changes and modifications as fall fairly within the true spirit and scope of the invention.

What is claimed is:

1. Apparatus for the electrochemical analysis of solutions, said apparatus comprising a pair of electrically conducting means presenting opposed faces disposed along surfaces that are equidistant from each other throughout their areas, biasing means for constraining said electrically conducting means for operative motion relatively toward and away from each other between relative positions at which said opposed faces are remote from and contiguous with each other, a solution-absorbent sheet of non-conductive material for carrying the solution to be analyzed disposed between and detachably contacting a metallic sheet and one of said faces, said one of said faces being carbon, said metallic sheet being disposed between said non-conductive sheet and the other of said faces in detachable, contacting relationship therewith, said faces each being greater in extent than said metallic sheet and said non-conductive sheet, said metallic sheet being greater in extent than said non-conductive sheet, external source means for applying a direct current between said one of said electrically conducting means at a positive potential and the other of said electrically conducting means at ground, micrometer means for determining the distance between said faces to allow duplication of said distance by adjusting said biasing means, and measuring means for indicating current flow between said faces.

2. Apparatus for the electrochemical analysis of solutions, said apparatus comprising a pair of electrically conducting means presenting opposed faces that are equidistant from each other throughout their areas, biasing means for constraining said electrically conducting means for operative motion relatively toward and away from each other between relative positions at which said opposed faces are remote from and contiguous with each other, a solution absorbent sheet of non-conductive material for carrying the solution disposed between and detachably contacting a metallic sheet and one of said faces, said metallic sheet being disposed between said non-conductive sheet and the other of said faces in detachable contacting relation therewith, said metal sheet overlapping said non-conductive sheet in order to prevent the solution from contacting said other of said faces, means for indirectly determining the pressure applied by said faces on said non-conductive sheet to allow duplication of said pressure by adjusting said biasing means, and electrical circuit means for externally applying a direct current across said faces and for measuring the resulting electrical phenomena.

References Cited by the Examiner

UNITED STATES PATENTS

| | | | |
|---|---|---|---|
| 1,807,821 | 6/31 | Behr | 204—195 |
| 1,995,492 | 3/35 | Andrus et al. | 204—195 |
| 2,457,234 | 12/48 | Herbert et al. | 204—195 |
| 2,612,538 | 9/52 | Cahoon et al. | 204—195 |
| 2,651,612 | 9/53 | Haller | 204—195 |
| 2,681,571 | 6/54 | Becker | 204—195 |
| 2,805,191 | 9/57 | Hersch | 204—195 |
| 2,913,386 | 11/59 | Clark | 204—195 |
| 2,928,783 | 3/60 | Bacon | 204—256 |
| 2,943,028 | 6/60 | Thayer et al. | 204—195 |
| 2,975,052 | 3/61 | Fotland et al. | 204—1.1 |
| 3,028,317 | 4/62 | Wilson et al. | 204—195 |
| 3,046,786 | 7/62 | Tessem | 204—195 |

(Other references on following page)

Lingane: "Electroanalytical Chemistry," 2d ed., 1958, pp. 168–170.

Lyndon: "Storage Battery Engineering," 1911, p. 390.

JOHN H. MACK, *Primary Examiner.*

JOHN R. SPECK, MURRAY TILLMAN, WINSTON A. DOUGLAS, *Examiners.*